US012658048B2

(12) United States Patent
Vassilovski et al.

(10) Patent No.: US 12,658,048 B2
(45) Date of Patent: Jun. 16, 2026

(54) ENFORCING RANGE RELIABILITY FOR INFORMATION SHARED VIA WIRELESS TRANSMISSIONS

(71) Applicant: QUALCOMM Incorporated, San Diego, CA (US)

(72) Inventors: Dan Vassilovski, Del Mar, CA (US); Hong Cheng, Basking Ridge, NJ (US); Gene Wesley Marsh, San Diego, CA (US); Shailesh Patil, San Diego, CA (US); Qing Li, Princeton Junction, NJ (US); Lan Yu, Beijing (CN); Hui Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/926,958

(22) PCT Filed: Jul. 15, 2020

(86) PCT No.: PCT/CN2020/102041
§ 371 (c)(1),
(2) Date: Nov. 21, 2022

(87) PCT Pub. No.: WO2022/011584
PCT Pub. Date: Jan. 20, 2022

(65) Prior Publication Data
US 2023/0237914 A1 Jul. 27, 2023

(51) Int. Cl.
*G08G 1/16* (2006.01)
*B60W 30/18* (2012.01)
(Continued)

(52) U.S. Cl.
CPC ....... *G08G 1/161* (2013.01); *B60W 30/18163* (2013.01); *G08G 1/166* (2013.01); *G08G 1/22* (2013.01); *H04W 4/40* (2018.02)

(58) Field of Classification Search
CPC ........... H04W 4/40; H04W 4/44; H04W 4/46; G08G 1/096791; G08G 1/161;
(Continued)

(56) References Cited

U.S. PATENT DOCUMENTS 10,308,246 B1 * 6/2019 Konrardy ............... G05D 1/223
12,184,419 B2 * 12/2024 Yu ......................... H04L 1/1861
(Continued)

FOREIGN PATENT DOCUMENTS

CN 106797543 A 5/2017
CN 108696896 A * 10/2018 ............ H04W 28/24
(Continued)

OTHER PUBLICATIONS

EPO machine translation of CN 111314852 A (original CN document published Jun. 19, 2020) (Year: 2020).*
(Continued)

*Primary Examiner* — David A Testardi
(74) *Attorney, Agent, or Firm* — Seyfarth Shaw LLP

(57) ABSTRACT

An ego vehicle determines an intended maneuver and identifies a first set of agents for coordinating the intended maneuver. The ego vehicle also determines a spatial distance for obtaining a level of communication reliability with the set of agents that is greater than a communication reliability threshold. The ego vehicle further applies the determined spatial distance to a sensor-sharing message. The ego vehicle also transmits the sensor-sharing message to a second set of agents within the determined range. The ego vehicle performs the intended maneuver.

17 Claims, 9 Drawing Sheets

700 ⟶

(51) Int. Cl.
  *G08G 1/00*        (2006.01)
  *H04W 4/40*        (2018.01)

(58) Field of Classification Search
  CPC . G08G 1/166; G08G 1/167; B60W 30/18163;
                B60W 2556/45; B60W 2556/65
  See application file for complete search history.

(56)                    References Cited

U.S. PATENT DOCUMENTS

| | | | |
|---|---|---|---|
| 2014/0012492 A1* | 1/2014 | Bowers | G08G 1/16 |
| | | | 701/301 |
| 2016/0227380 A1* | 8/2016 | Zhang | H04W 4/90 |
| 2018/0199364 A1* | 7/2018 | Feng | H04W 72/02 |
| 2018/0376525 A1* | 12/2018 | Feng | H04W 72/04 |
| 2019/0059071 A1* | 2/2019 | Khoryaev | H04W 4/021 |
| 2019/0069051 A1 | 2/2019 | Al-Stouhi et al. | |
| 2020/0106563 A1* | 4/2020 | Akoum | H04B 7/026 |
| 2020/0160694 A1* | 5/2020 | Jornod | G08G 1/0141 |
| 2020/0210729 A1 | 7/2020 | Beaurepaire | |
| 2020/0314832 A1* | 10/2020 | Baghel | H04W 88/04 |
| 2020/0394915 A1* | 12/2020 | Salles | B60W 10/18 |
| 2021/0014716 A1* | 1/2021 | Zhou | H04W 24/10 |
| 2021/0014831 A1* | 1/2021 | Ryu | H04W 72/02 |
| 2021/0160849 A1* | 5/2021 | Sun | H04W 72/046 |
| 2021/0250118 A1* | 8/2021 | Roth-Mandutz | H04W 72/56 |
| 2021/0329596 A1* | 10/2021 | Freda | H04W 72/02 |
| 2021/0392541 A1* | 12/2021 | Lu | H04W 28/0268 |
| 2021/0400448 A1* | 12/2021 | Adjakple | H04W 4/40 |
| 2022/0015167 A1* | 1/2022 | Kim | H04W 76/38 |
| 2022/0043097 A1* | 2/2022 | Li | G01S 5/0054 |
| 2022/0070844 A1* | 3/2022 | Lee | H04W 4/02 |
| 2022/0159674 A1* | 5/2022 | Deng | H04W 72/20 |
| 2022/0166556 A1* | 5/2022 | Lee | H04L 1/1825 |
| 2022/0217497 A1* | 7/2022 | Ebrahim Rezagah | |
| | | | G01S 5/0205 |
| 2022/0217513 A1* | 7/2022 | Back | H04W 4/021 |
| 2022/0217698 A1* | 7/2022 | Lee | H04W 4/029 |
| 2022/0232408 A1* | 7/2022 | Lee | H04W 24/10 |
| 2022/0256357 A1* | 8/2022 | Kim | H04W 72/12 |
| 2022/0264455 A1* | 8/2022 | Kwak | H04W 92/18 |
| 2022/0337347 A1* | 10/2022 | Yu | G08G 1/094 |
| 2022/0343241 A1* | 10/2022 | Jha | G08G 1/166 |
| 2022/0393834 A1* | 12/2022 | Thomas | H04W 72/20 |
| 2023/0091763 A1* | 3/2023 | Mohammad Soleymani | |
| | | | H04W 72/02 |
| | | | 370/329 |
| 2023/0092224 A1* | 3/2023 | Mohammad Soleymani | |
| | | | H04W 72/56 |
| | | | 370/329 |

FOREIGN PATENT DOCUMENTS

| | | | | |
|---|---|---|---|---|
| CN | 110782684 A | 2/2020 | | |
| CN | 111083645 A | 4/2020 | | |
| CN | 111200842 A | 5/2020 | | |
| CN | 111314852 A | * 6/2020 | | H04W 28/0268 |
| WO | 2020092742 A1 | 5/2020 | | |
| WO | WO-2020096693 A1 | * 5/2020 | | H04W 52/242 |
| WO | WO-2020171642 A1 | * 8/2020 | | |
| WO | WO-2021159592 A1 | * 8/2021 | | H04W 28/0268 |

OTHER PUBLICATIONS

Ganesan, Karthikeyan et al., "NR Sidelink Design Overview for Advanced V2X Service" IEEE Intenet of Things Magazine, Mar. 2020, pp. 26-30. (Year: 2020).*

SAE, Automated Driving: Levels of Driving Automation are defined in new SAE International Standard J3016, Copyright Â © 2014 SAE International, 2 pages (Year: 2014).*

Mir, Zeeshan Hameed et al., "Applications, Requirements, and Design Guidelines for Multi-tiered Vehicular Network Architecture", 2018 Wireless Days (WD), © 2018 IEEE, pp. 15 to 20. (Year: 2018).*

Ganesan, Karthikeyan et al., "5G V2X Architecture and Radio Aspects", 2019 IEEE Conference on Standards for Communications and Networking (CSCN), © 2019 IEEE, 6 pages (Year: 2019).*

International Search Report and Written Opinion—PCT/CN2020/102041—ISA/EPO—Apr. 19, 2021.

KDDI Corporation: "Initial View on Enhancements of Unicast and Groupcast Communication", 3GPP TSG RAN WG1 Meeting #94bis, R1-1811162, Chengdu, China, Oct. 8, 2018-Oct. 12, 2018, 5 Pages, Oct. 12, 2018 (Oct. 12, 2018).

Supplementary European Search Report—EP20945466—Search Authority—Munich—Mar. 4, 2024.

ETSI: "5G, Architecture enhancements for 5G System (5GS) to support Vehicle-to-Everything (V2X) services (3GPP TS 23.287 version 16.6.0 Release 16)", ETSI TS 123 287 V16.6.0, (Jan. 2022), 60 Pages. https://www.etsi.org/deliver/etsi_ts/123200_123299/123287/16.06.00_60/ts_123287v160600p.pdf. (Jan. 2022).

* cited by examiner

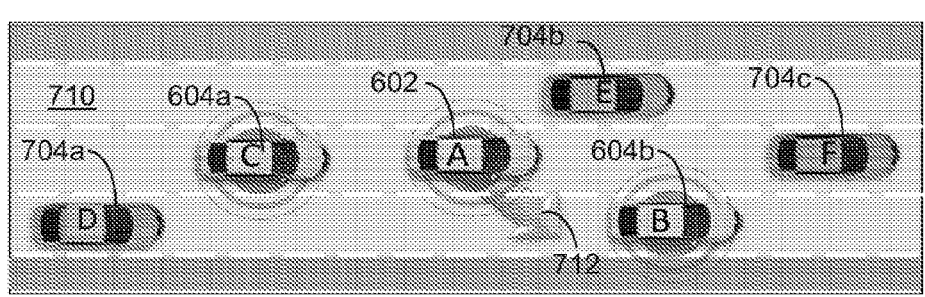
FIG. 7A
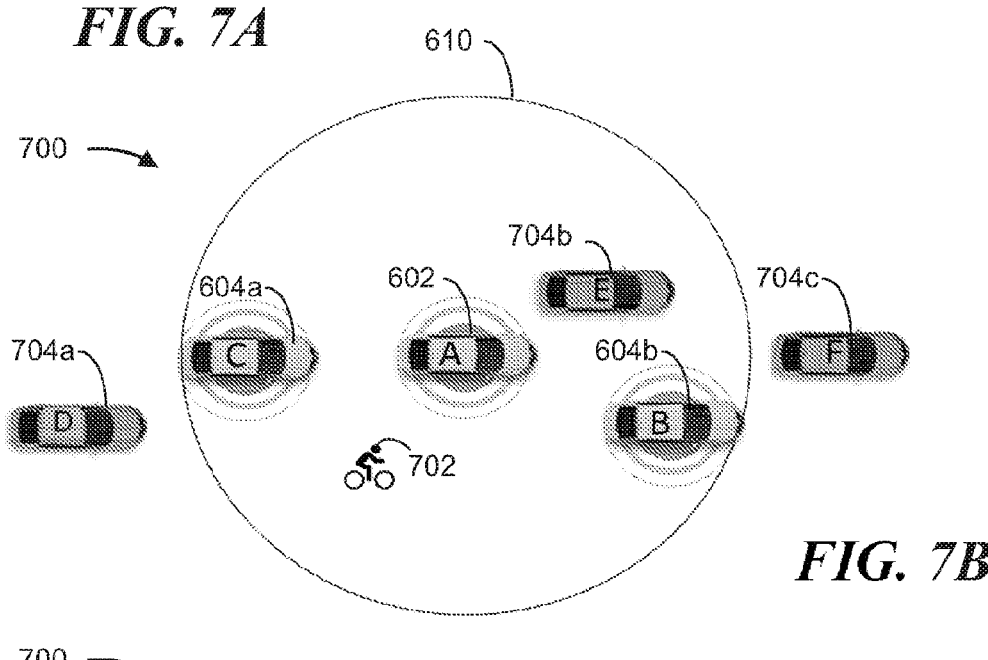
FIG. 7B
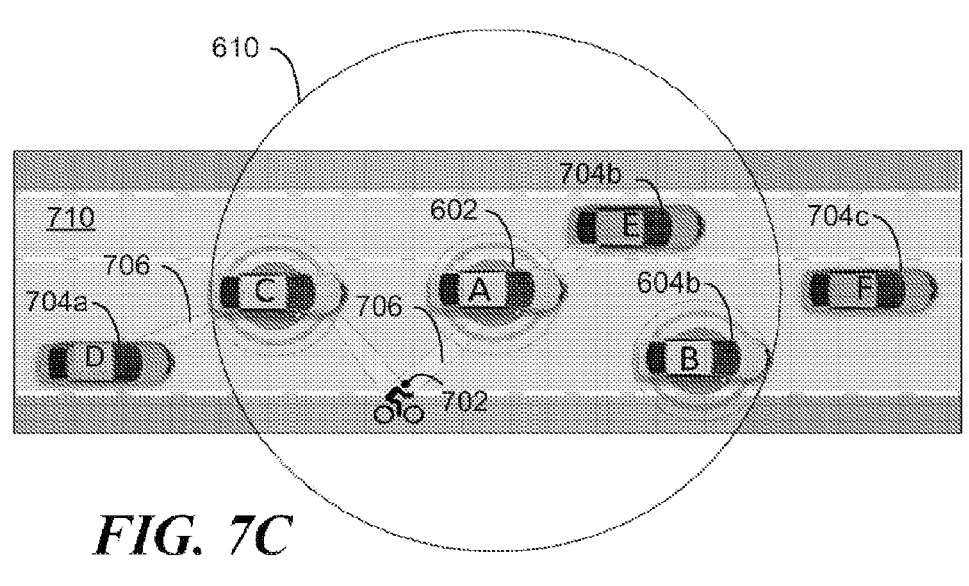
FIG. 7C
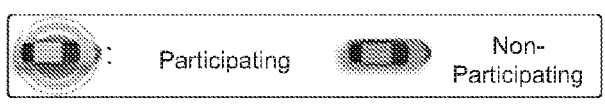

ENFORCING RANGE RELIABILITY FOR INFORMATION SHARED VIA WIRELESS TRANSMISSIONS

FIELD OF THE DISCLOSURE

Aspects of the present disclosure generally relate to wireless communications, and more particularly to techniques and apparatuses for enforcing a range reliability for information via wireless transmissions.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink UEs, such as vehicles, may communicate directly with each other using device-to-device (D2D) communications over a D2D wireless link. These communications can be referred to as sidelink communications.

As the demands for sidelink communications increase, different V2X communications systems compete for the same wireless communications resources. Moreover, some sidelink UEs may be power limited. Accordingly, there is a need to improve the efficiency of sidelink wireless communications.

SUMMARY

According to an aspect of the present disclosure, a method performed by an ego vehicle determines an intended maneuver of the ego vehicle. The method also identifies a first set of agents for coordinating the intended maneuver. The method also determines a spatial distance for obtaining a level of communication reliability with the set of agents that is greater than a communication reliability threshold. The method also applies the determined spatial distance to a sensor-sharing message. The method also transmits the sensor-sharing message to a second set of agents within the determined spatial distance. The method further performs the intended maneuver.

In another aspect of the present disclosure, an apparatus of an ego vehicle includes means for determining an intended maneuver of the ego vehicle. The apparatus also includes means for identifying a first set of agents for coordinating the intended maneuver. The apparatus also includes means for determining a spatial distance for obtaining a level of communication reliability with the set of agents that is greater than a communication reliability threshold. The apparatus also includes means for applying the determined spatial distance to a sensor-sharing message. The apparatus also includes means for transmitting the sensor-sharing message to a second set of agents within the determined spatial distance. The apparatus further includes means for performing the intended maneuver.

In another aspect of the present disclosure, an ego vehicle, includes a processor and memory coupled with the processor. Instructions stored in the memory are operable, when executed by the processor, to cause the apparatus to determine an intended maneuver of the ego vehicle. The apparatus can also identify a first set of agents for coordinating the intended maneuver. The apparatus can also determine a spatial distance for obtaining a level of communication reliability with the set of agents that is greater than a communication reliability threshold. The apparatus can also apply the determined spatial distance to a sensor-sharing message. The apparatus can also transmit the sensor-sharing message to a second set of agents within the determined spatial distance. The apparatus can further perform the intended maneuver.

In another aspect of the present disclosure, a non-transitory computer-readable medium with program code recorded thereon is disclosed. The program code is executed by an ego vehicle and includes program code to determine an intended maneuver of the ego vehicle. The ego vehicle also includes program code to identify a first set of agents for coordinating the intended maneuver. The ego vehicle also includes program code to determine a spatial distance for obtaining a level of communication reliability with the set of agents that is greater than a communication reliability threshold. The ego vehicle also includes program code to apply the determined spatial distance to a sensor-sharing message. The ego vehicle also includes program code to transmit the sensor-sharing message to a second set of agents within the determined spatial distance. The ego vehicle further includes program code to perform the intended maneuver.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7C are diagrams illustrating an example of an ego vehicle applying a range for distance-aware reliable coordination to sensor-sharing communications, in accordance with aspects of the present disclosure.

DETAILED DESCRIPTION

Figure 1:
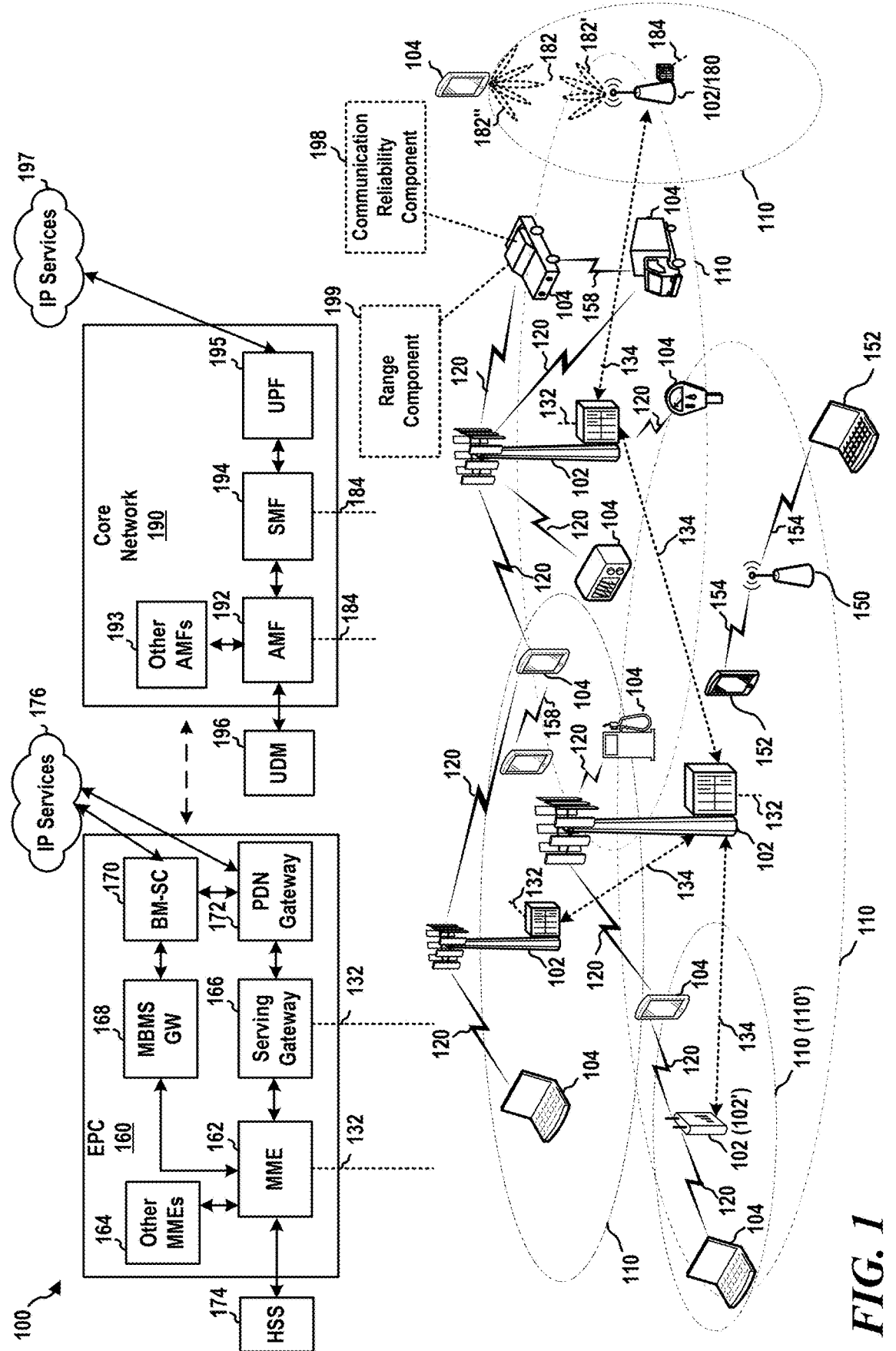
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Currently, standards bodies are in the process of defining application-layer standards for advanced vehicle-to-everything (V2X) features. These features include sensor-sharing (e.g., dissemination of detected vehicles and/or objects) and coordinated driving (e.g., sharing and negotiating intended maneuvers). V2X messages can be exchanged with vehicles, infrastructure components, and/or road side units (RSUs). For ease of explanation, aspects of the present disclosure discuss V2X messages and features. Aspects of the present disclosure may also be implemented for vehicle-to-vehicle (V2V), vehicle-to-infrastructure (V2I), and/or other peer-to-peer type communications.

3GPP NR V2X has introduced, in Release-16, application-aware, distance-based high-reliability communication for groupcast communication. The application-aware, distance-based high-reliability improves a reliability of physical layer communication, such as V2X messages, as a function of range (e.g., a distance between locations of participating vehicles). This feature is beneficial in environments where multiple vehicles exchange information and/or coordinate maneuvers.

Aspects of the present disclosure are directed to improving the reliability of sensor-sharing messages by applying (e.g., enforcing) a range of interest determined by an application layer. The sensor-sharing messages may identify one or more objects in an environment, such as vehicles, pedestrians, and/or obstacles, via one or more sensors of a vehicle. The vehicle may detect the objects independent of a coordinated maneuver. The range of interest may be determined by the application layer based on one or more criteria such as, a pre-defined (e.g., default) range for a specific maneuver, a function of the ego vehicle speed, a function of characteristics (e.g., relative speed and/or distance) of a detected adjacent vehicle, and/or a function of the road conditions (e.g., congested environment, number of lanes, and/or sensor visibility).

That is, range of interest determined based on one or more criteria may be applied to sensor-sharing messages. In one example, the range criteria is applied, such that the sensor-sharing messages are transmitted with a level of communication reliability equal to, or greater than, the communication reliability of coordinated driving messages transmitted for the coordinated driving maneuver. Aspects of the present disclosure may improve the reliability of sensor-sharing messages. Aspects of the present disclosure are not limited to sensor-sharing messages and may be applied to other types of physical-layer communication.

In one implementation, an application-layer component of a vehicle determines a range of interest based on one or more criteria, such as the criteria described above. For example, the range of interest may be pre-defined for an intended maneuver of the vehicle. The vehicle may be referred to as an ego vehicle that may communicate with one or more participating vehicles. In one implementation, the ego vehicle communicates with other vehicles via a multicast cellular vehicle-to-everything (CV2X) communication. In this implementation, the CV2X communication is an application-aware, distance-based high-reliability communication. As an example, for a sensor sharing message, the transmitting vehicle (e.g., ego vehicle) does not specify a response from a receiving vehicle.

As described, the application-layer component determines a spatial distance for distance-aware reliable CV2X communication. Additionally, the application-layer component applies the determined spatial distance to sensor-sharing messages. For example, the ego vehicle may identify one or more objects in an environment prior to, during, and after performing a coordinated maneuver with one or more participating vehicles. The one or more objects may be road users and/or non-participating vehicles. The ego vehicle may transmit sensor-sharing messages to the one or more participating vehicles. The sensor-sharing messages may describe the one or more identified road users and/or non-participating vehicles. Aspects of the present disclosure are not limited to transmitting sensor-sharing messages before performing a coordinated maneuver. The sensor-sharing message may be independent of the coordinated maneuver.

In some cases, a sensor-sharing message may be referred to as a collective perception message. For ease of explanation, the sensor sharing message of the present disclosure refers to a message identifying one or more objects in an environment. The environment may be a spatial environment surrounding an ego agent. The one or more objects may be identified via one or more sensors of the ego agent.

In this implementation, the physical-layer component enforces the spatial distance for sensor-sharing messages, such that the sensor-sharing messages are transmitted to agents (e.g., participating vehicles) within the determined spatial distance. In one configuration, the ego vehicle also coordinates the intended maneuver with agents within the determined spatial distance. Additionally, in this implementation, the ego vehicle performs the intended maneuver.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, include a communication reliability component 198 configured to determine a spatial distance for obtaining a level of communication reliability with a set of vehicles that is greater than a communication reliability threshold. Additionally, or alternatively, the UE 104 may include a range component 199 configured for determining an intended maneuver of the ego vehicle. The range component may also be configured to determine a range for distance-aware reliable coordination of the intended maneuver. In one implementation, the range component 199 may also be configured to apply the determined range to a sensor-sharing message.

Although the following description may be focused on 5G NR, it may be applicable to other similar areas, such as LTE, LTE-A, CDMA, GSM, and other wireless technologies.

Figures 2A, 2B, 2C, 2D:
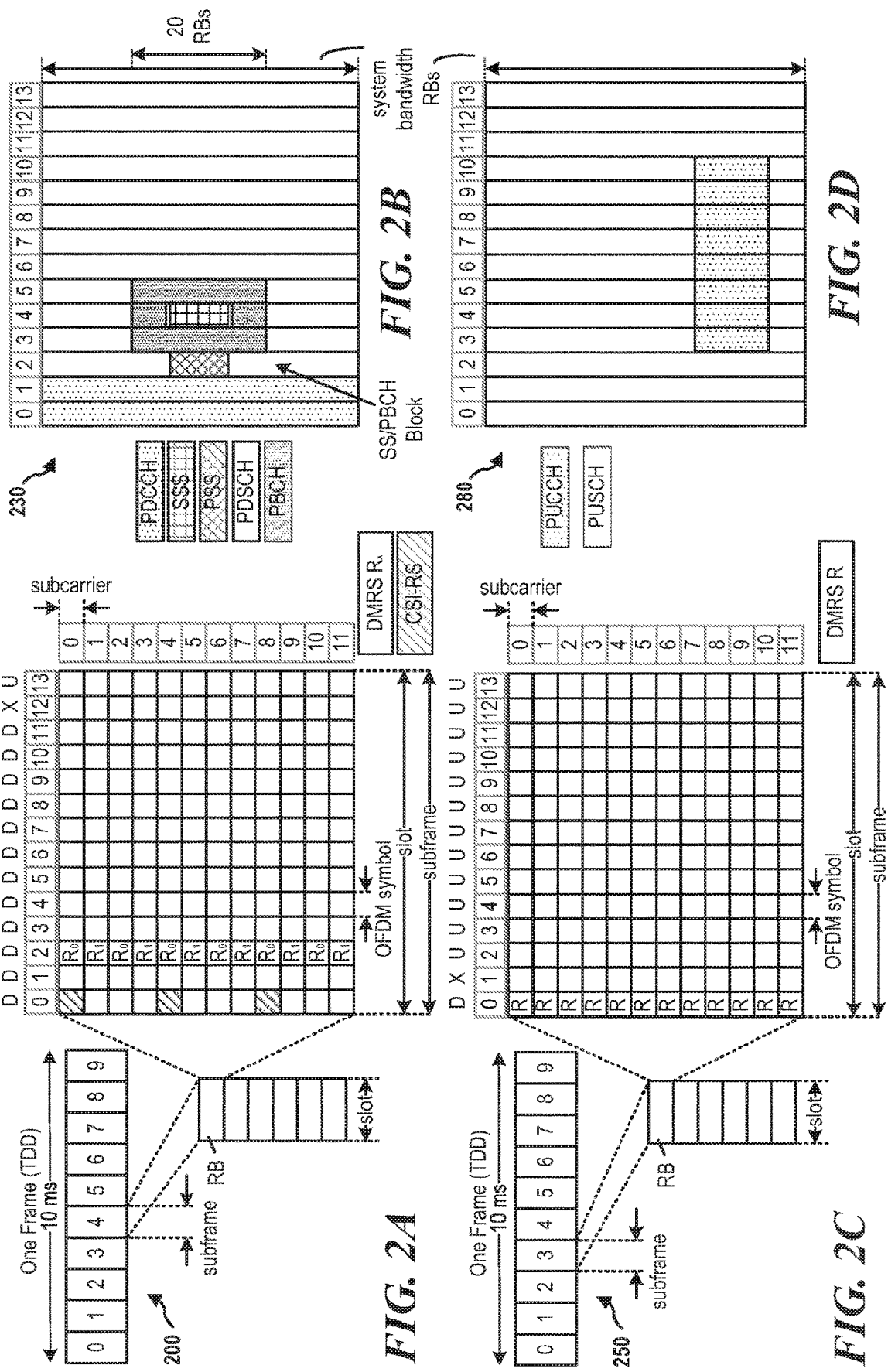
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
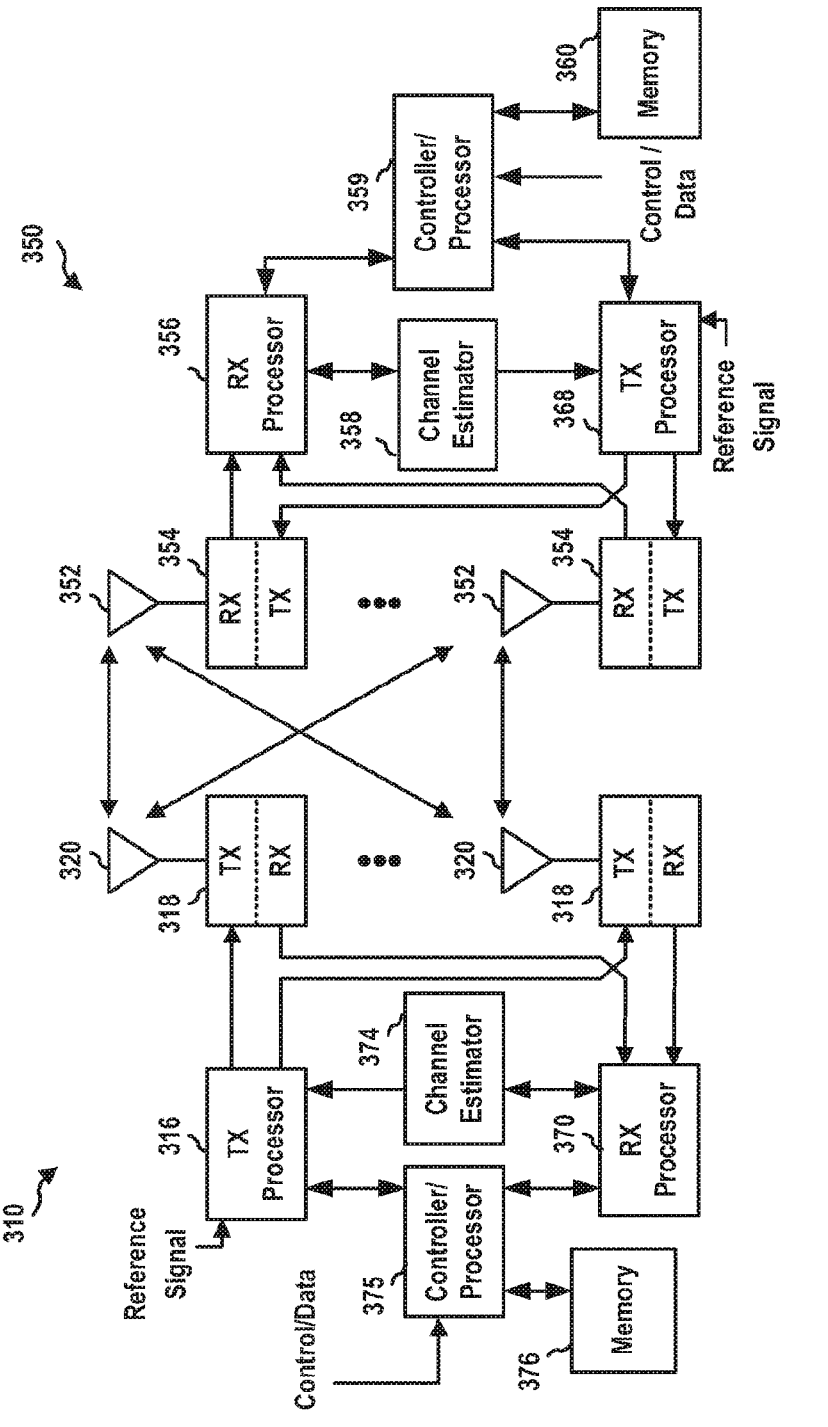
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the range component 199 of FIG. 1.

Figure 4:
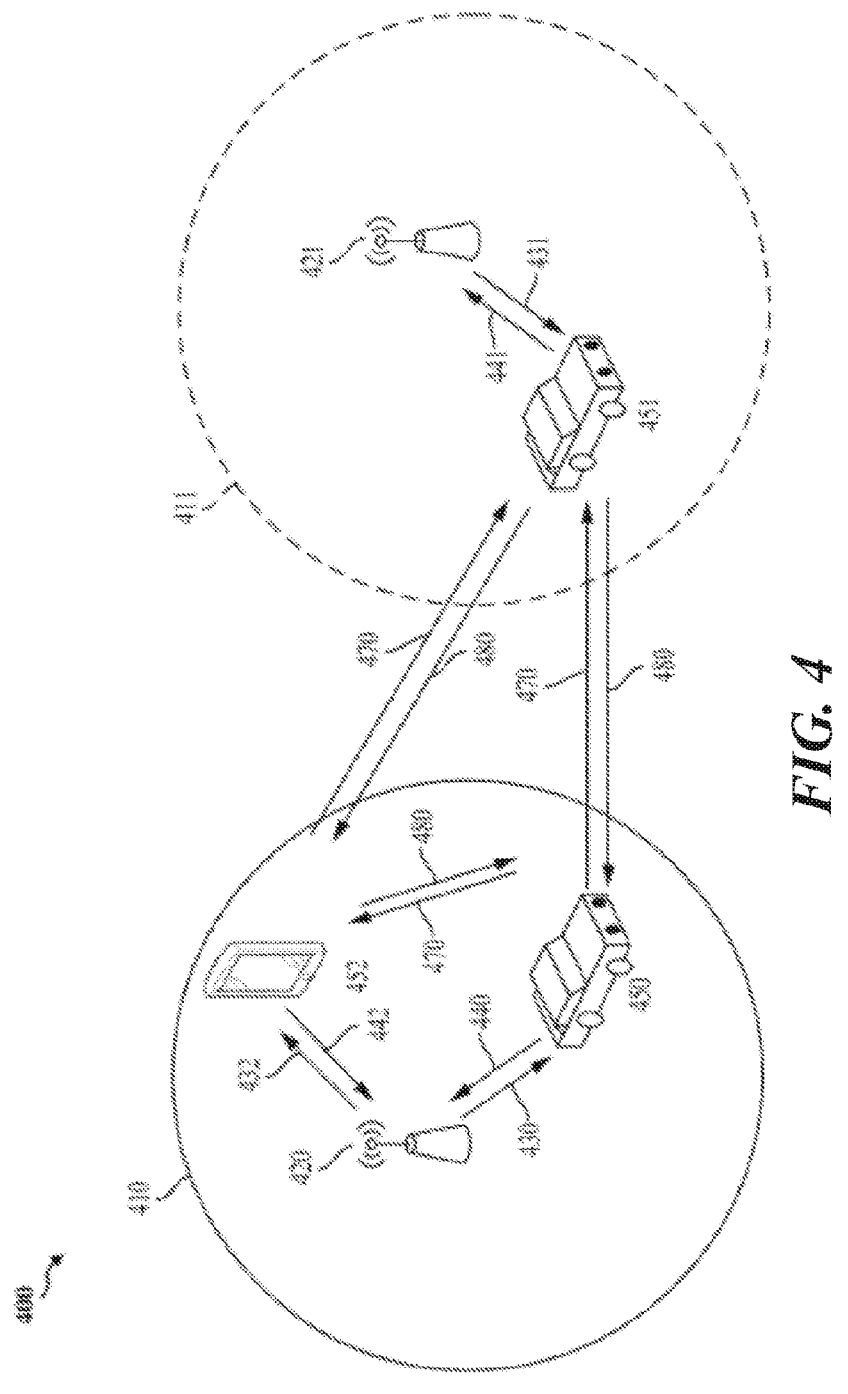
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more FDM channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
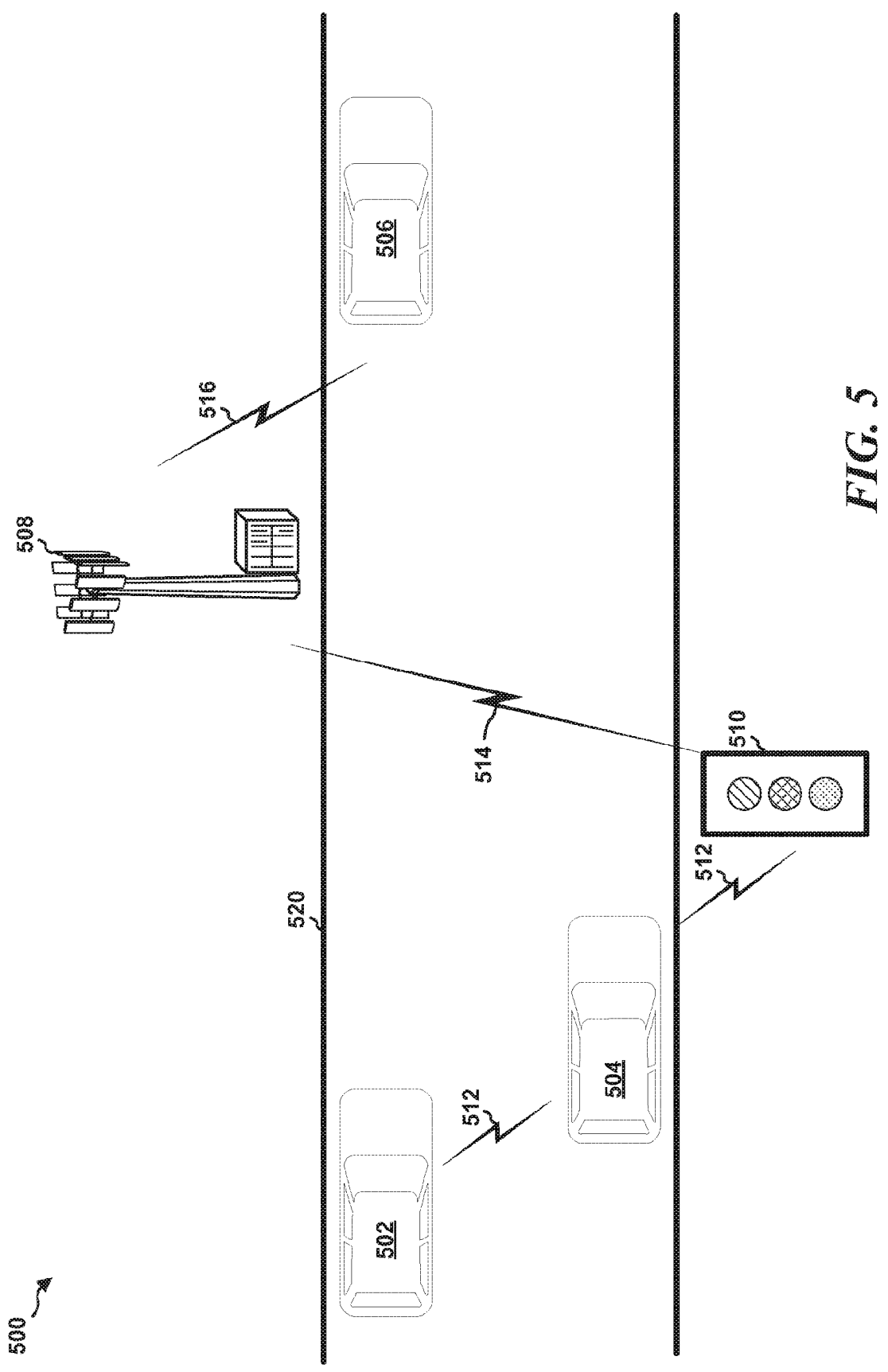
FIG. 5 is a block diagram illustrating an example of a vehicle-to-everything (V2X) system with a road side unit (RSU), according to aspects of the present disclosure.

FIG. 5 illustrates an example of a V2X system 500 with an RSU 510 according to aspects of the present disclosure. As shown in FIG. 5, a transmitter UE 504 transmits data to an RSU 510 and a receiver UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Standards bodies, including the Society of Automotive Engineers (SAE), the European Telecommunications Standards Institute European Telecommunication Standard (ETSI-ETS), and the Chinese Society of Automotive Engineers (CSAE), define application-layer standards for advanced vehicle-to-everything (V2X) communication. The advanced V2X features include, for example, sensor-sharing (e.g., dissemination of detected vehicles and/or objects) and coordinated driving (e.g., sharing and negotiating intended maneuvers). The described V2X features trigger broadcast transmissions, multicast transmissions, and/or of V2X message exchanges between vehicles, infrastructure components, and/or road side units (RSUs). For ease of explanation, aspects of the present disclosure discuss V2X messages and features. Aspects of the present disclosure may also be implemented for V2V, V2I, and/or other peer-to-peer type communications.

Sensor-sharing messages may identify one or more objects in an environment, such as vehicles, pedestrians, and/or obstacles, via one or more sensors of a vehicle. The vehicle may detect the objects independent of a coordinated maneuver. Still, in some cases, sensor-sharing may enable, or improve, coordinated driving. For example, when vehicles coordinate a maneuver, each vehicle should obtain spatial environment information, such as road conditions and surrounding objects. The spatial environment information may be obtained from sensor information provided by one or more sensors integrated with the vehicle and/or via sensor-sharing information received from other participating vehicles (for example, vehicles participating in V2X communications). As such, to avoid collisions and improve safety, coordinated driving may integrate information obtained from sensor-sharing. The sensor-sharing information may provide location information for one or more identified objects, such as road users, non-participating vehicles, road features, and/or or obstructions.

3GPP NR V2X has introduced, in Release-16, application-aware, distance-based high-reliability communications for groupcast communications, which can improve the reliability of V2X messages sent using this capability, as measured by packet error rate (PRR). The application-aware, distance-based high-reliability communications improves communication reliability, such as physical-layer communication, as a function of range (e.g., a distance between locations of participating vehicles). For ease of explanation, application-aware, distance-based high-reliability communication may be referred to as distance-aware reliable communication.

As described, an ego vehicle may exchange V2X messages with participating vehicles to coordinate an intended maneuver. The V2X messages may include coordinated maneuver messages and sensor-sharing messages. The sensor-sharing messages may identify, at least, a location of a number of road users (e.g., pedestrians and cyclists) a number of non-participating vehicles (e.g., non-V2X communicating vehicles), road features, and/or or obstructions. Each participating vehicle may be at a different location in relation to the ego vehicle. In some examples, to improve reliability of the coordinated maneuver, the coordinated maneuver messages are transmitted to participating vehicles within a range of the ego vehicle. Each type of maneuver performed by the ego vehicle may correspond to a specific range. That is, two different types of maneuvers may correspond to two different ranges.

For example, a lane change may be one type of maneuver. In this example, the range corresponding to a lane change may equal three car lengths (e.g., tens of meters). As another example, traversal of an intersection may be another type of maneuver. In this example, the range corresponding to the traversal of an intersection may be greater than the range of the lane change. In both examples, the participating vehicles should be aware of the locations of road users, non-participating vehicles, road features, and/or or obstructions. Such information can be provided in a sensor-sharing message. Therefore, it would be desirable to improve the reliability of sensor-sharing communications.

Conventional systems do not enforce range criteria on sensor-sharing messages. Therefore, sensor-sharing messages may be unreliable. Aspects of the present disclosure are directed to improving the reliability of sensor-sharing messages by applying (e.g., enforcing) a range of interest (e.g., rang criteria) determined by an application layer. The sensor-sharing messages may identify one or more objects in an environment, such as vehicles, pedestrians, and/or obstacles, via one or more sensors of a vehicle. As an example, the reliability may be improved by reducing the packet error rate.

As described, range of interest may be determined by the application layer based on one or more criteria such as, a pre-defined (e.g., default) range for a specific maneuver, a function of the ego vehicle speed, a function of characteristics (e.g., relative speed and/or distance) of a detected adjacent vehicle, and/or a function of the road conditions (e.g., congested environment, number of lanes, and/or sensor visibility).

Figure 6:
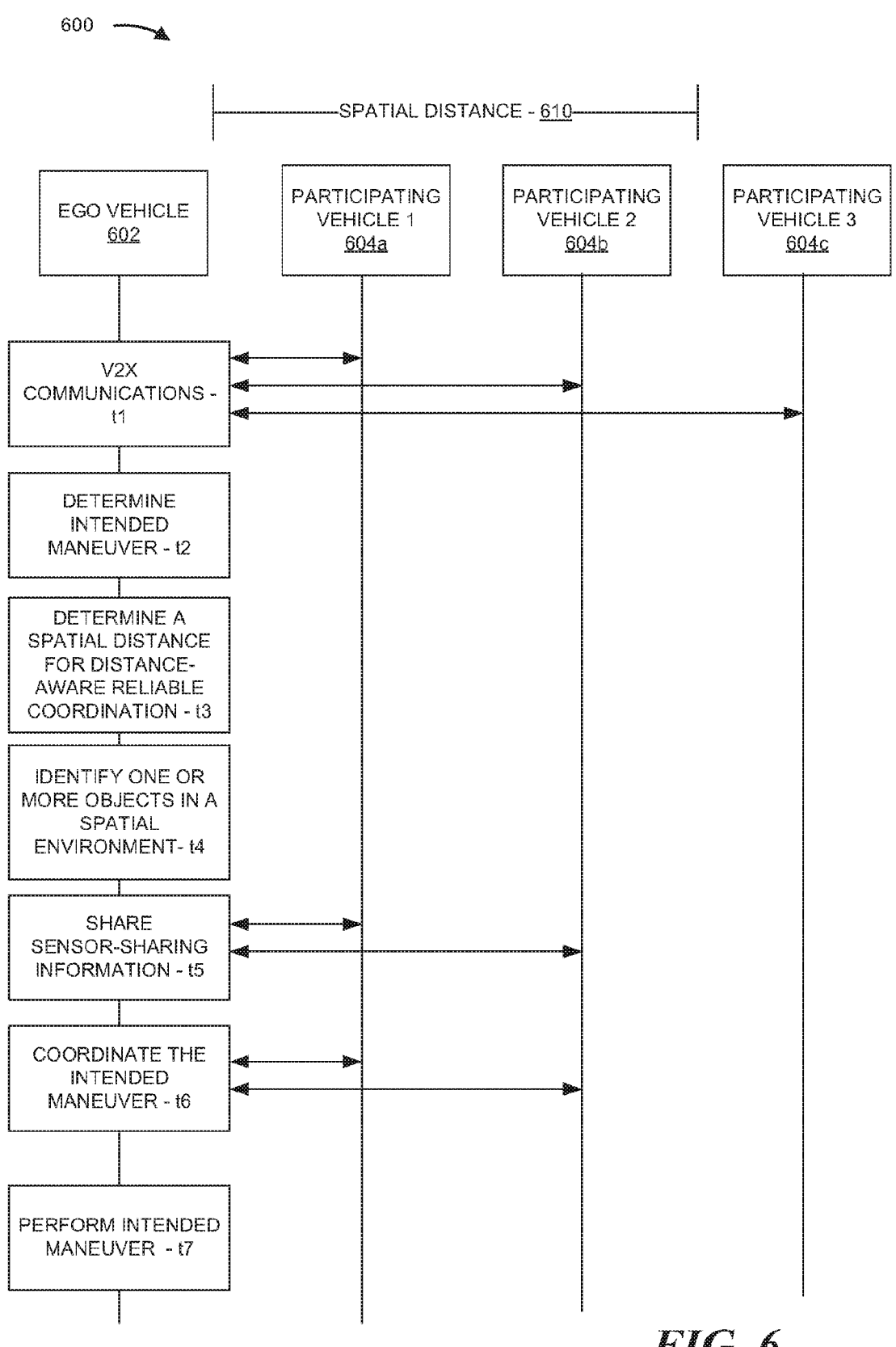
FIG. 6 illustrates a timing diagram for applying a spatial distance to sensor-sharing messages, in accordance with aspects of the present disclosure.

FIG. 6 illustrates a timing diagram 600 for applying a range (or spatial distance) 610 to sensor-sharing messages, in accordance with aspects of the present disclosure. As shown in FIG. 6, at time t1, an ego vehicle may exchange communications with a number of participating vehicles 604a, 604b, 604c (shown as participating vehicle 1, participating vehicle 2, and participating vehicle 3). The ego vehicle 602 may be an example of a UE 104, 450, 504 described with reference to FIGS. 1, 4, and 5. The participating vehicles 604a, 604b, 604c may be examples of a UE 104, 451, 504, 506 or RSU 510 described with reference to FIGS. 1, 4, and 5. In the present disclosure, the participating vehicles 604a, 604b, 604c are not limited to vehicles, the participating vehicles 604a, 604b, 604c may also include one or more UEs and/or RSUs. The participating vehicles 604a, 604b, 604c may also be referred to as participating agents or agents.

At time t2, an application-layer component, such as the range component 199 as described in FIG. 1, determines the ego vehicle 602 intends to perform a maneuver. The intended maneuver may be determined based on, for example, a vehicle occupant's input (e.g., driver input) and/or a planned route (e.g., a route planned by a navigation component and/or an autonomous driving component of the ego vehicle 602). The ego vehicle 602 may operate in an autonomous mode, a semi-autonomous mode, or another type of operating mode.

In the autonomous mode, the ego vehicle 602 may autonomously navigate from one location to another location without human input. The ego vehicle 602 may operate in the autonomous mode regardless of whether the ego vehicle 602 is occupied. In the semi-autonomous mode, the ego vehicle 602 may be operated by a human driver, and the ego vehicle 602 may override one or more inputs to maintain safety.

In response to determining the intended maneuver, at time t3, the application-layer component determines a range (or spatial distance) 610 for distance-aware reliable (e.g., high-reliability) coordination of the intended maneuver. Coordination of the intended maneuver refers to exchanging coordinated maneuver messages between the ego vehicle 602 and one or more participating vehicles 604a, 604b, 604c. The range 610 for the distance-aware reliable coordination may be based on a type of intended maneuver (e.g., lane change, turn, etc.), a speed of the ego vehicle 602, a number of agents adjacent to the ego vehicle 602, road conditions, visibility, road type, and/or other factors. The number of agents adjacent to the ego vehicle 602 may refer to a number of agents within a distance of the ego vehicle 602. The number of agents may include a number of participating vehicles, a number of non-participating vehicles, a number of road users, and/or a number of other objects in the environment surrounding the ego vehicle 602. The distance may be based on, for example, one or more of at least the type of intended maneuver, the road condition, the type of road, and the speed of the ego vehicle.

In the current example, the first participating vehicle 604a and the second participating vehicle 604b are within the determined range 610 for the distance-aware reliable coordination. The range 610 refers to a distance from the ego vehicle 602. The range 610 may be different from the distance for identifying the number of agents adjacent to the ego vehicle 602.

As described, sensor-sharing information may improve a coordinated maneuver. In the example of FIG. 6, at time t4, one or more sensors of the ego vehicle 602 may identify one or more objects in a spatial environment. For example, the one or more sensors may identify road users, non-participating vehicles, road features, and/or or obstructions within a distance of the ego vehicle 602. The distance may be based on sensor-range, a type of intended maneuver, and/or other factors. In one implementation, the range determined for distance-aware reliable coordination may be applied to sensor-sharing communication. The range for sensor-sharing communication is different from a sensor-range for detecting object in the spatial environment.

At time t5, the ego vehicle 602 shares sensor-sharing information (e.g., transmits a sensing-sharing message) with the participating vehicles 604a, 604b within the range 610. The application-layer component may enforce the range on the physical-layer sensor-sharing communications performed at time t5. Additionally, the participating vehicles 604a, 604b may share sensor-sharing information with the ego vehicle 602. As shown in FIG. 6, at time t6, the ego vehicle 602 coordinates the intended maneuver with participating vehicles 604a, 604b within the range 610. The intended maneuver may be coordinated by exchanging coordinated maneuver messages over one or more V2X channels. Finally, at time t7, the ego vehicle 602 performs the intended maneuver.

FIGS. 7A-7C are diagrams illustrating an example 700 of an ego vehicle 602 applying a range 610 for distance-aware reliable coordination to sensor-sharing communications. As shown in FIG. 7A, an ego vehicle 602 (shown as vehicle A), as described in FIG. 6, is traveling on a road 710. Participating vehicles 604a, 604b (shown as vehicles B, C), as described in FIG. 6, are adjacent to the ego vehicle 602. Additionally, a road user 702 and non-participating vehicles 704*a*, 704*b*, 704*c* (shown as vehicles D, E, F) may be in a vicinity of the ego vehicle 602. As described, the participating vehicles 604*a*, 604*b* may exchange V2X communications with the ego vehicle 602. The road user 702 and non-participating vehicles 704*a*, 704*b*, 704*c* may not be capable of exchanging V2X communications with the ego vehicle 602.

In the example of FIG. 7A, an application-layer component of the ego vehicle 602, such as the range component 199 as described in FIG. 1, determines the ego vehicle 602 intends to perform a maneuver 712. In the example of FIG. 7A, the maneuver 712 is a lane change. The intended maneuver 712 may be determined based on, for example, a vehicle occupant's input (e.g., a driver engaging a turn signal or moving the steering wheel) and/or a planned route (e.g., a route planned by a navigation module of the ego vehicle 602).

As shown in FIG. 7B, in response to determining the intended maneuver, the application-layer component determines a range 610 for distance-aware reliable coordination of the intended maneuver 712. The range 610 for the distance-aware reliable coordination may be based on a type of the intended maneuver, a speed of the ego vehicle 602, a number of vehicles adjacent to the ego vehicle 602, road conditions, visibility, road type, and/or other factors. In the current example, the first participating vehicle 604*a* and the second participating vehicle 604*b* are within the determined range 610 for the distance-aware reliable coordination.

As described, the ego vehicle 602 may exchange sensor-sharing messages with the participating vehicles 604*a*, 604*b*. In the example of FIG. 7C, the determined range 610 for the distance-aware reliable coordination is applied to sensor-sharing communications. In this example, the ego vehicle 602 may identify the road user 702 and second non-participating vehicle 704*b* based on sensor information 706. The ego vehicle 602 may transmit a sensor-sharing message providing (e.g., describing) a location of the road user 702 and second non-participating vehicle 704*b* to the participating vehicles 604*a*, 604*b* within the determined range 610 for the distance-aware reliable coordination. The sensor-sharing message is not limited to providing location information of road users and non-participating vehicles. The sensor-sharing message may provide other information, such as a type of non-participating vehicle.

Figures 8A, 8B:
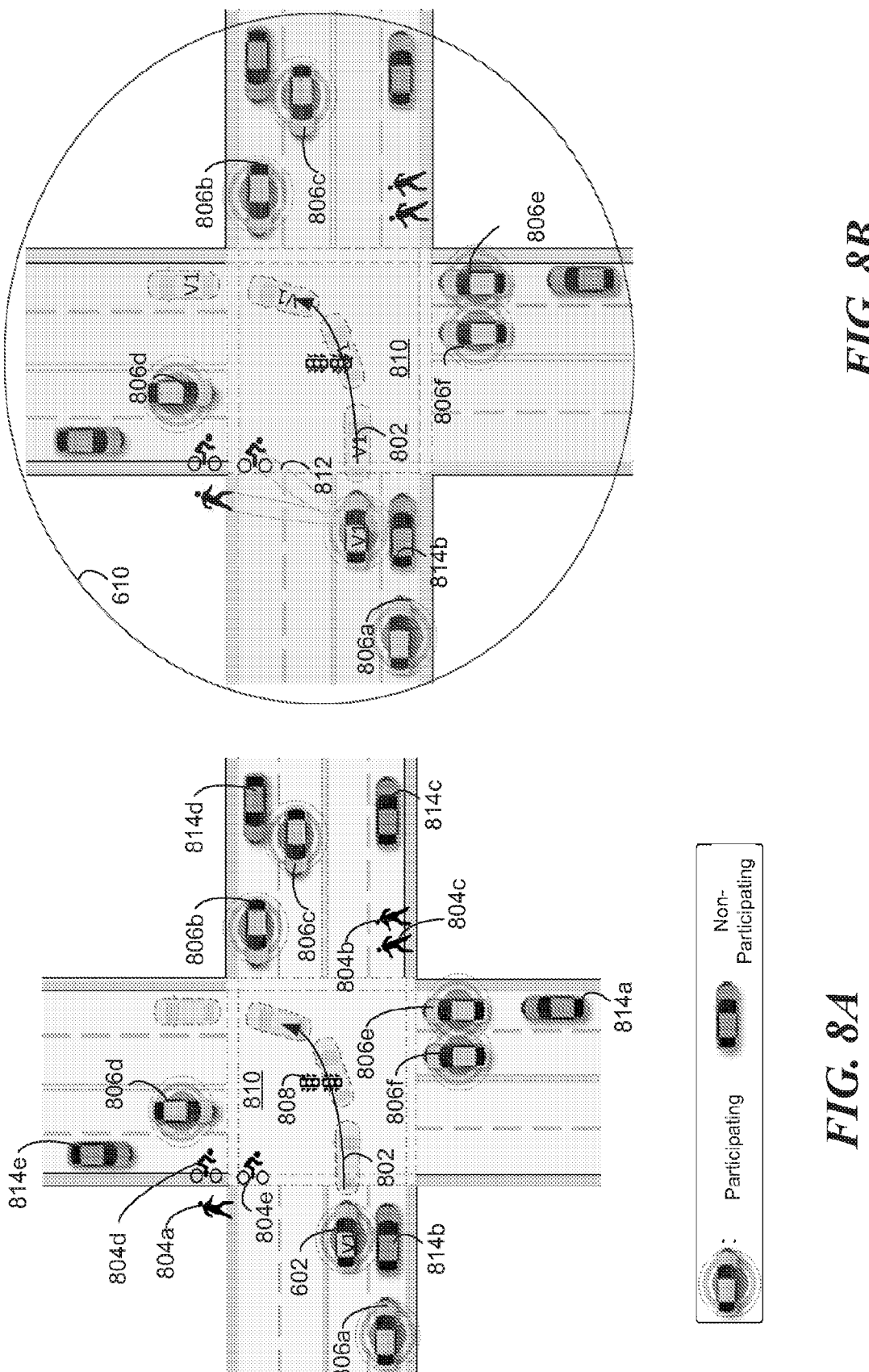
FIGS. 8A-8B are diagrams illustrating an example of an ego vehicle applying a range for distance-aware reliable coordination to sensor-sharing communications, in accordance with aspects of the present disclosure.

FIGS. 8A-8B are diagrams illustrating an example 800 of an ego vehicle 602 applying a range 610 for distance-aware reliable coordination to sensor-sharing communications. As shown in FIG. 8A, an ego vehicle 602 (shown as vehicle V1), as described in FIG. 6, is stopped at an intersection 810. Participating vehicles 806*a*, 806*b*, 806*c*, 806*d*, 806*e*, 806*f* are located within a distance of the intersection 810. Additionally, road users 804*a*, 804*b*, 804*c*, 804*d*, 804*e* and non-participating vehicles 814*a*, 814*b*, 814*c*, 814*d*, 814*e* are located within a distance of the intersection 810. A traffic light 808 (e.g., infrastructure) is located at the intersection 810.

In the example of FIG. 8A, an application-layer component of the ego vehicle 602, such as the range component 199 as described in FIG. 1, determines the ego vehicle 602 intends to perform a maneuver 802. In the example of FIG. 8A, the maneuver 802 is a left turn through the intersection 810. The intended maneuver 802 may be determined based on, for example, a vehicle occupant's input (e.g., a driver engaging a turn signal or moving the steering wheel) and/or a planned route (e.g., a route planned by a navigation module of the ego vehicle 602).

As shown in FIG. 8B, in response to determining the intended maneuver 802, the application-layer component determines a range 610 for distance-aware reliable coordination of the intended maneuver 802. The range 610 for the distance-aware reliable coordination may be based on a type of the intended maneuver, a speed of the ego vehicle 602, a number of vehicles adjacent to the ego vehicle 602, road conditions, visibility, road type, and/or other factors. In the current example 800, at least, a number of adjacent agents and the road type are different from the number of adjacent agents and the road type of the example 700 of FIGS. 7A-7C. Therefore, the range 610 shown in the example of FIG. 8B may be larger than the range 610 shown in the example of FIGS. 7B-C. As shown in FIG. 8B, the participating vehicles 806*a*, 806*b*, 806*c*, 806*d*, 806*e*, 806*f* are within the determined range 610 for the distance-aware reliable coordination.

As described, the ego vehicle 602 may exchange sensor-sharing messages with the participating vehicles 806*a*, 806*b*, 806*c*, 806*d*, 806*e*, 806*f*. In the example of FIG. 8B, the determined range 610 for the distance-aware reliable coordination is applied to sensor-sharing communications. In this example, the ego vehicle 602 may identify a first road user 804*a*, a fourth road user 804*d*, and a fifth road user 804*e*, as well as a second non-participating vehicle 814*b* based on sensor information 812. The ego vehicle 602 may transmit a sensor-sharing message identifying (e.g., describing) the first road user 804*a*, fourth road user 804*d*, fifth road user 804*e*, and second non-participating vehicle 814*b* to the participating vehicles 806*a*, 806*b*, 806*c*, 806*d*, 806*e* within the determined range 610 for the distance-aware reliable coordination.

Based on an application-layer determination of a reliability range for a coordinated maneuver (e.g., lane change), the same reliability range is applied to sensor-sharing messages describing non-vehicle road users, non-V2X-capable vehicles.

As indicated above, FIGS. 6, 7A, 7B, 7C, 8A, and 8B are provided as examples. Other examples may differ from what is described with respect to FIGS. 6, 7A, 7B, 7C, 8A, and 8B.

Figure 9:
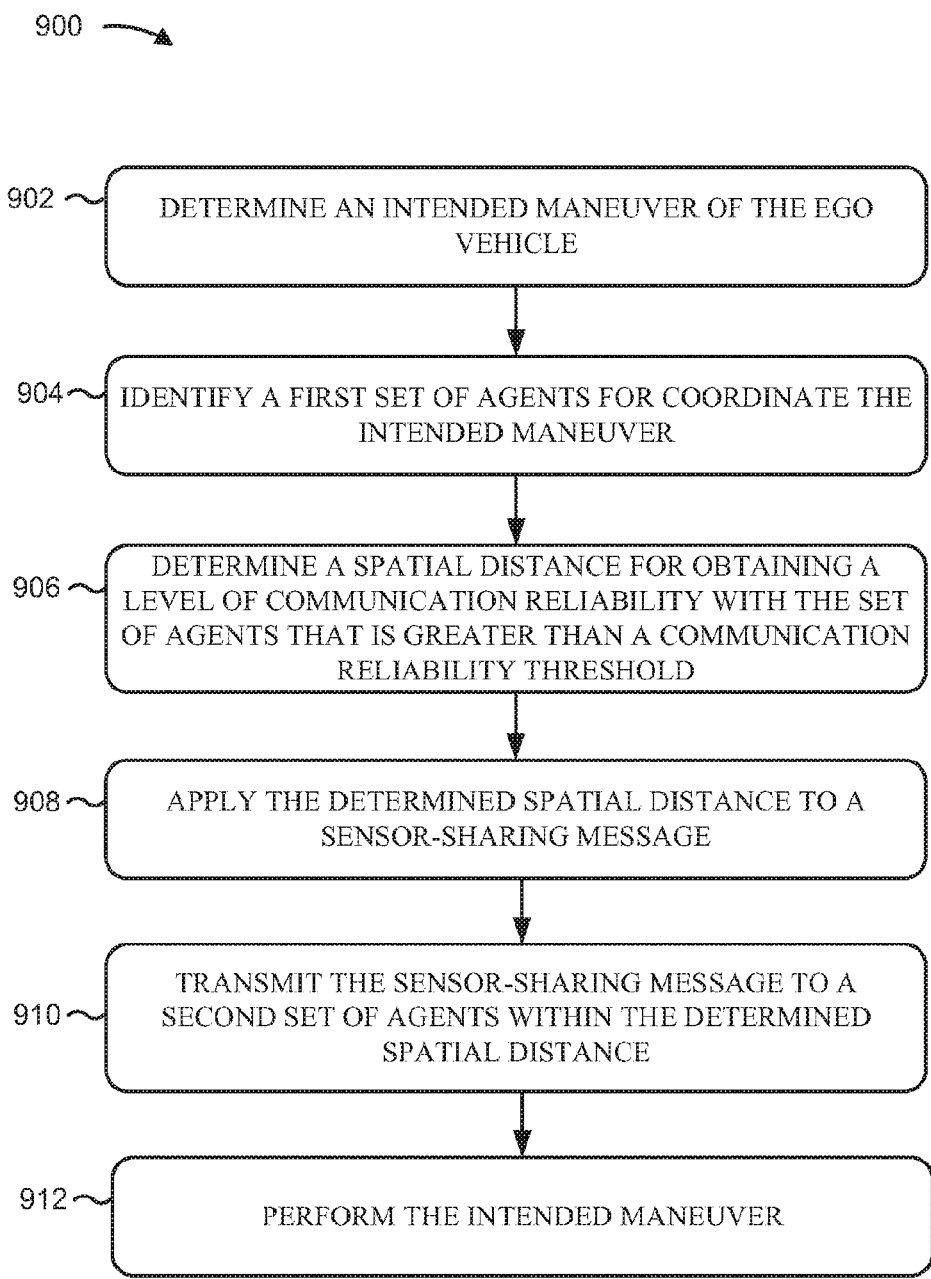
FIG. 9 is a flow diagram illustrating an example process performed, for example, by a user equipment, in accordance with various aspects of the present disclosure.

FIG. 9 is a diagram illustrating an example process 900 performed, for example, by an ego vehicle, in accordance with various aspects of the present disclosure. The example process 900 is an example of enforcing range reliability for information shared via wireless transmissions.

As shown in FIG. 9, in some aspects, the process 900 may include determining an intended maneuver of the ego vehicle (block 902). For example, the ego vehicle (e.g., using the antenna 352, RX/TX 354, RX processor 356, TX processor 368, controller/processor 359, and/or memory 360) can determine an intended maneuver of the ego vehicle. In some aspects, the process 900 may include identifying a first set of agents for coordinating the intended maneuver (block 904). For example, the ego vehicle (e.g., using the antenna 352, RX/TX 354, TX processor 368, controller/processor 359, and/or memory 360) can identify a first set of agents for coordinating the intended maneuver.

As shown in FIG. 9, in some aspects, the process 900 may include determining a spatial distance for obtaining a level of communication reliability with the set of agents that is greater than a communication reliability threshold (block 906). For example, the ego vehicle (e.g., using the antenna 352, RX/TX 354, RX processor 356, TX processor 368, controller/processor 359, and/or memory 360) can determine a spatial distance.

As shown in FIG. 9, in some aspects, the process 900 may include applying the determined spatial distance to a sensor-sharing message (block 908). For example, the ego vehicle (e.g., using the antenna 352, RX/TX 354, RX processor 356, controller/processor 359, and/or memory 360) can determine a spatial distance. In some aspects, the process 900 may include transmitting the sensor-sharing message to a second set of agents within the determined spatial distance (block 910). For example, the ego vehicle (e.g., using the antenna 352, RX/TX 354, TX processor 368, controller/processor 359, and/or memory 360) can transmit the sensor-sharing message to a second set of agents within the determined spatial distance. In some aspects, the process 900 may include performing the intended maneuver (block 912). For example, the ego vehicle (e.g., using the controller/processor 359, and/or memory 360) can perform the intended maneuver.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set"

and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method performed by an ego vehicle operating in an autonomous driving mode, comprising:

identifying, via a sensor integrated with the ego vehicle, a set of objects within a range of the sensor, the sensor being a light detection and ranging (LiDAR) sensor or a radio detection and ranging sensor (RADAR) sensor;

communicating, via device-to-device (D2D) communications, with a set of agents;

determining whether an intended maneuver of the ego vehicle is a lane change or a turn;

determining a range of interest in accordance with both a speed of the ego vehicle and the intended maneuver being either the lane change or the turn;

transmitting one or more sensor-sharing messages, via one or more D2D transmissions, to only a subset of agents of the set of agents within the range of interest of the ego vehicle in accordance with the intended maneuver being the lane change or the turn, the range of interest being different than the range of the sensor for identifying the set of objects via the sensor, a first quantity of agents in the subset of agents being less than a second quantity of agents in the set of agents; and autonomously performing the intended maneuver in coordination with each agent of the subset of agents based on the transmission of the one or more sensor-sharing messages.

2. The method of claim 1, in which each D2D transmission of the one or more D2D transmissions is one or more of a vehicle-to-everything (V2X) transmission, a vehicle-to-vehicle (V2V) transmission, or a vehicle-to-infrastructure (V2I) transmission.

3. The method of claim 1, in which the set of agents includes one or more of a vehicle, an infrastructure component, a road side unit, or a non-vehicular road user.

4. The method of claim 1, in which:

the ego vehicle is capable of performing a plurality of maneuvers;

each maneuver of the plurality of maneuvers corresponds to a respective spatial distance of a plurality of spatial distances; and each spatial distance of the plurality of spatial distances is associated with a different distance.

5. The method of claim 1, in which the one or more sensor-sharing messages indicate one or more objects detected within a distance of the ego vehicle via the sensor integrated with the ego vehicle.

6. The method of claim 5, in which the one or more objects comprise at least one of non-V2X capable vehicles, non-vehicular road users, infrastructure, road obstacles, road impairments, or a combination thereof.

7. An apparatus of an ego vehicle, comprising:

means for identifying, via a sensor integrated with the ego vehicle, a set of objects within a range of the sensor, the sensor being a light detection and ranging (LiDAR) sensor or a radio detection and ranging sensor (RADAR) sensor;

means for communicating, via device-to-device (D2D) communications, with a set of agents;

means for determining whether an intended maneuver of the ego vehicle is a lane change or a turn;

means for determining a range of interest in accordance with both a speed of the ego vehicle and the intended maneuver being either the lane change or the turn;

means for transmitting one or more sensor-sharing messages, via one or more D2D transmissions, to only a subset of agents of the set of agents within the range of interest of the ego vehicle in accordance with the intended maneuver being the lane change or the turn, the range of interest being different than the range of the sensor for identifying the set of objects via the sensor, a first quantity of agents in the subset of agents being less than a second quantity of agents in the set of agents; and means for autonomously performing the intended maneuver in coordination with each agent of the subset of agents based on the transmission of the one or more sensor-sharing messages.

8. The apparatus of claim 7, in which each D2D transmission of the one or more D2D transmissions is one or more of a vehicle-to-everything (V2X) transmission, a vehicle-to-vehicle (V2V) transmission, or a vehicle-to-infrastructure (V2I) transmission.

9. The apparatus of claim 7, in which the set of agents includes one or more of a vehicle, an infrastructure component, a road side unit, or a non-vehicular road user.

10. The apparatus of claim 7, in which:

the ego vehicle is capable of performing a plurality of maneuvers;

each maneuver of the plurality of maneuvers corresponds to a respective spatial distance of a plurality of spatial distances; and each spatial distance of the plurality of spatial distances is associated with a different distance.

11. The apparatus of claim 7, in which the one or more sensor-sharing messages indicate one or more objects detected within a distance of the ego vehicle via the sensor integrated with the ego vehicle.

12. An ego vehicle, comprising:

at least one processor;

at least one memory coupled with the at least one processor; and instructions stored in the at least one memory and operable, when executed by the at least one processor, to cause the ego vehicle:

to identify, via a sensor integrated with the ego vehicle, a set of objects within a range of the sensor, the sensor being a light detection and ranging (LiDAR) sensor or a radio detection and ranging sensor (RADAR) sensor;

to communicate, via device-to-device (D2D) communications, with a set of agents;

to determine whether an intended maneuver of the ego vehicle is a lane change or a turn;

to determine a range of interest in accordance with both a speed of the ego vehicle and the intended maneuver being either the lane change or the turn;

to transmit one or more sensor-sharing messages, via one or more D2D transmissions, to only a subset of agents of the set of agents within the range of interest of the ego vehicle in accordance with the intended maneuver being the lane change or the turn, the range of interest being different than the range of the sensor for identifying the set of objects via the sensor, a first quantity of agents in the subset of agents being less than a second quantity of agents in the set of agents; and to autonomously perform the intended maneuver in coordination with each agent of the subset of agents based on the transmission of the one or more sensor-sharing messages.

13. The ego vehicle of claim 12, in which each D2D transmission of the one or more D2D transmissions is one or more of a vehicle-to-everything (V2X) transmission, a vehicle-to-vehicle (V2V) transmission, or a vehicle-to-infrastructure (V2I) transmission.

14. The ego vehicle of claim 12, in which the set of agents includes one or more of a vehicle, an infrastructure component, a road side unit, or a non-vehicular road user.

15. The ego vehicle of claim 12, in which:

the ego vehicle is capable of performing a plurality of maneuvers;

each maneuver of the plurality of maneuvers corresponds to a respective spatial distance of a plurality of spatial distances; and each spatial distance of the plurality of spatial distances is associated with a different distance.

16. The ego vehicle of claim 12, in which the one or more sensor-sharing messages indicate one or more objects detected within a distance of the ego vehicle via the sensor integrated with the ego vehicle.

17. A non-transitory computer-readable medium having program code recorded thereon, the program code being executable by a processor and the program code comprising:

program code to identify, via a sensor integrated with an ego vehicle, a set of objects within a range of the sensor, the sensor being a light detection and ranging (LiDAR) sensor or a radio detection and ranging sensor (RADAR) sensor;

program code to communicate, via device-to-device (D2D) communications, with a set of agents;

program code to determine whether an intended maneuver of the ego vehicle is a lane change or a turn;

program code to determine a range of interest in accordance with both a speed of the ego vehicle and the intended maneuver being either the lane change or the turn;

program code to transmit one or more sensor-sharing messages, via one or more D2D transmissions, to only a subset of agents of the set of agents within the range of interest of the ego vehicle in accordance with the intended maneuver being the lane change or the turn, the range of interest being different than the range of the sensor for identifying the set of objects via the sensor, a first quantity of agents in the subset of agents being less than a second quantity of agents in the set of agents; and program code to autonomously perform the intended maneuver in coordination with each agent of the subset of agents based on the transmission of the one or more sensor-sharing messages.

* * * * *